G. E. PALMER.
CASING.
APPLICATION FILED JUNE 6, 1910.
1,036,317.
Patented Aug. 20, 1912.
2 SHEETS—SHEET 1.
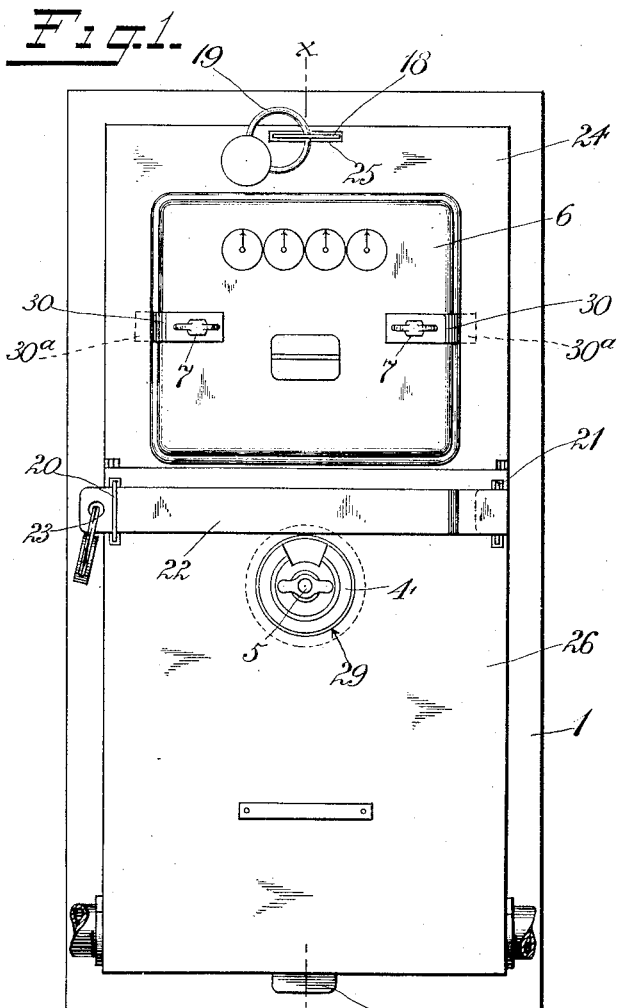
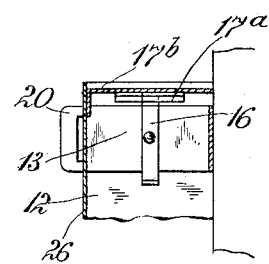
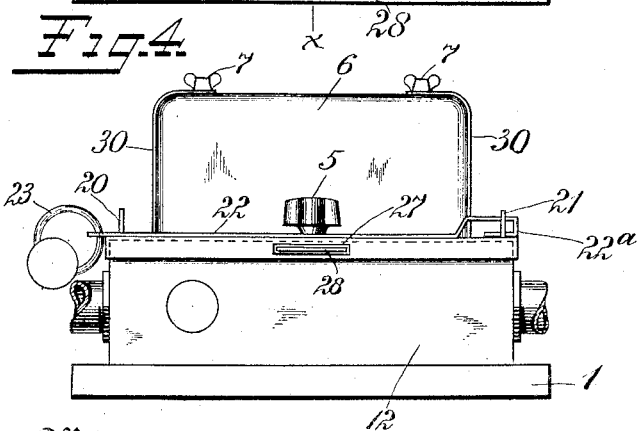
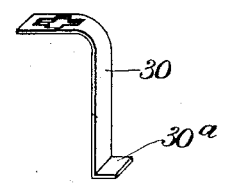
Witnesses:
Fred K. M. Dannenfelser
Chas. M. Peard
Inventor
G. E. PALMER
By his Attorneys
Bartlett, Brownell & Mitchell

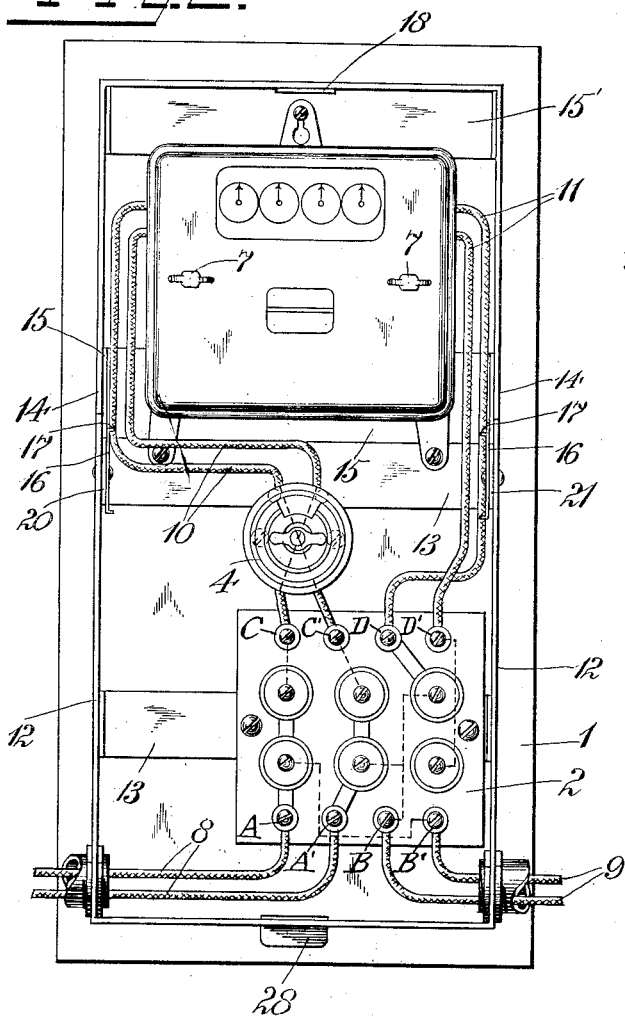
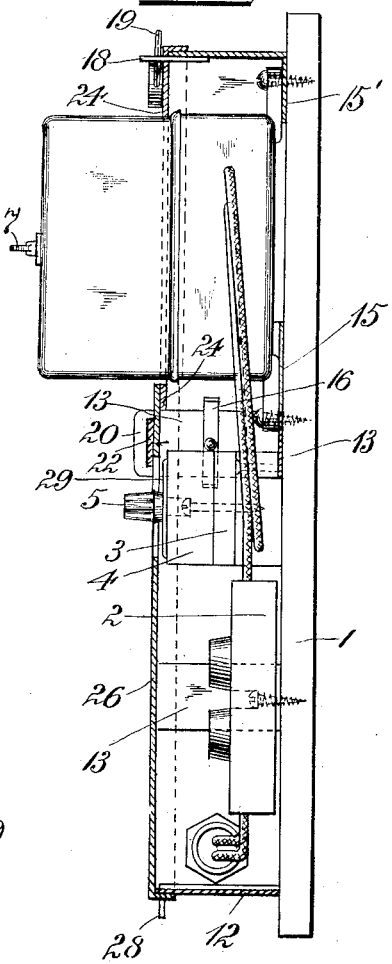
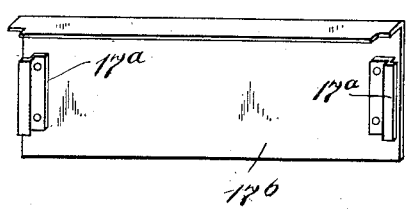
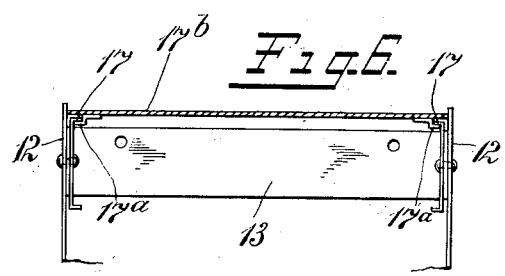

UNITED STATES PATENT OFFICE.

GRANVILLE E. PALMER, OF WINCHESTER, MASSACHUSETTS, ASSIGNOR, BY MESNE ASSIGNMENTS, TO THE METROPOLITAN ENGINEERING COMPANY, A CORPORATION OF NEW YORK.

CASING.

1,036,317.

Specification of Letters Patent.

Patented Aug. 20, 1912.

Application filed June 6, 1910. Serial No. 565,199.

*To all whom it may concern:*

Be it known that I, GRANVILLE E. PALMER, a citizen of the United States, residing at Winchester, county of Middlesex, State of Massachusetts, have invented certain new and useful Improvements in Casings, of which the following is a full, clear, and exact description.

The invention relates to protective casings for electric meters and cut-out devices electrically connected thereto, and consists in the construction hereinafter described, whereby the locking in place of a cover prevents access to the connections of the meter and cut-out block, and to a switch interposed in said connections, whereby the meter and the portion of said casing inclosing the same may be removed, and the cut-out device still remain protected by the remaining portion of the casing, and whereby the switch may be manipulated while said casing is in place.

In the accompanying drawings Figure 1 shows a front elevation of the casing in connection with a meter; Fig. 2 shows the same with the covers and fastening means removed; Fig. 3 shows a vertical section of the same on the line $x$—$x$ Fig. 1; Fig. 4 shows an upward projection; Fig. 5 shows a perspective view of the closing slide; Figs. 6 and 7 show details of the slide in place, and Fig. 8 shows a detail of a screw fastener.

Upon a base 1 are secured a meter 6 and a cut-out or connection block 2. The main leads 8 are connected to the terminals A, A' on said block, the load leads 9 are connected to the terminals B, B', the meter leads 10 are connected to the terminals C, C', and the meter leads 11 are connected to the terminals D, D'. In the leads 10 a rotary switch 3 is interposed, said switch having a cover 4 and an operating shaft and handle 5.

The wall of the rectangular casing for the meter and connection block is made in two U-shaped sections or frames 12 and 14, the ends of which are approximated. The meter is received in frame 14, and the connection block in frame 12. In frame 12 are two U-shaped cross pieces 13, having bent up ends suitably secured to said frame, and receiving the fastening screws by which said frame is secured to the base. Similar cross pieces 15, 15' are arranged in frame 14 and secured to the base in like manner. The edges of bar 15' protrude beyond the frame 14 and are received between the wall of frame 12 and metal strips 16, secured on the inner sides of the turned up ends of the bar 13 which is adjacent to said bar 15'.

The frame 14 is provided with a cover 24, having an opening 25 which receives a projection 18 on the wall of said frame, and also an opening through which the meter protrudes. Frame 12 also has a cover 26, which when in place extends over the edge of cover 24. In cover 26 are openings to receive projections 20 and 21 on the wall of frame 12, an opening 29 registering with the cover of switch 3 but somewhat smaller in diameter, and in an end flange, another opening to receive a projection 28 on the end wall of said frame. The cover 24 is secured in place by the overlapping edge of cover 26 and by a seal fastening 19, the shackle of which passes through a slot in projection 18. The cover 26 is secured in place by engagement, as described, with projection 28, and by the insertion of a locking bar 22 in slots in the projections 20, 21. One end of said bar is bent over, as shown at 22ª, and in the other end is a slot which receives the shackle of a seal fastening 23.

It will be obvious that the foregoing casing completely protects the connection block and its terminals, the joints between the meter leads and the meter, the switch 3, and the meter leads, while permitting the meter to be read and the switch to be operated, and that access to said parts cannot be had without removing cover 26, which can be done only after breaking the seal at 23.

It is frequently desirable to remove the meter, and still leave the connection block protected by a casing, so that unauthorized connections cannot be made with it. This I accomplish in the following manner: On the strips 16 are projections 17 which engage with flanges 17ª on the under side of a sliding cover 17ᵇ. When the meter and frame 14 are removed, cover 17ᵇ may be slid into place, closing the otherwise open side of frame 12. The cover 26 when in position, extends over the outer edge of cover 17ᵇ, thus preventing the withdrawal of cover 17ᵇ.

In order to prevent removal of the meter cover, the attaching screws 7 therefor have shanks of irregular cross section, upon which fit clips 30, provided with lateral projections 30ª extending beneath the cover 24.

I claim:

1. In combination with a base, a U-shaped frame, means within said frame for securing the same to said base, a sliding piece closing the open side of said frame, a cover for said frame extending over the outer edge of said sliding piece, and means for locking said cover to said frame.

2. In a device of the character described, the combination of a base, a connection block thereon, a wall embracing said connection block, a cover therefor, a meter on said base electrically connected to said block, a second wall removably secured to said base, a second cover engaging said second wall and extending beneath the top portion of said first cover, said second wall and cover embracing said meter, a switch located beneath said first cover and electrically interposed between said meter and said block on the line side of said meter, said first cover having a perforation whereby the actuating means of said switch are accessible, and means for securing said first cover to its wall.

3. The combination of a base, a meter having a cover, securing screws therefor whose exposed surfaces have non-circular sections, a wall secured to said base surrounding said meter, a cover secured to said wall and through which said meter extends, and fastening clips engaging said screws and extending beneath said cover so as to be retained thereby, and means for sealing said cover in engagement with said wall.

4. The combination of a base, a U-shaped wall secured thereto, a second U-shaped wall also secured to said base and separate from said first wall, overlapping covers for said walls, means engaging the outermost cover for securing said covers to said walls, said first wall having at its upper ends a surface beneath said cover and adapted to retain a slide closing the opening between its cover and said base.

GRANVILLE E. PALMER.

Witnesses:
H. A. HART,
M. H. GLYNN.